Dec. 18, 1962   W. H. HULTGREN ET AL   3,069,015
OIL FILTER
Filed Dec. 7, 1959
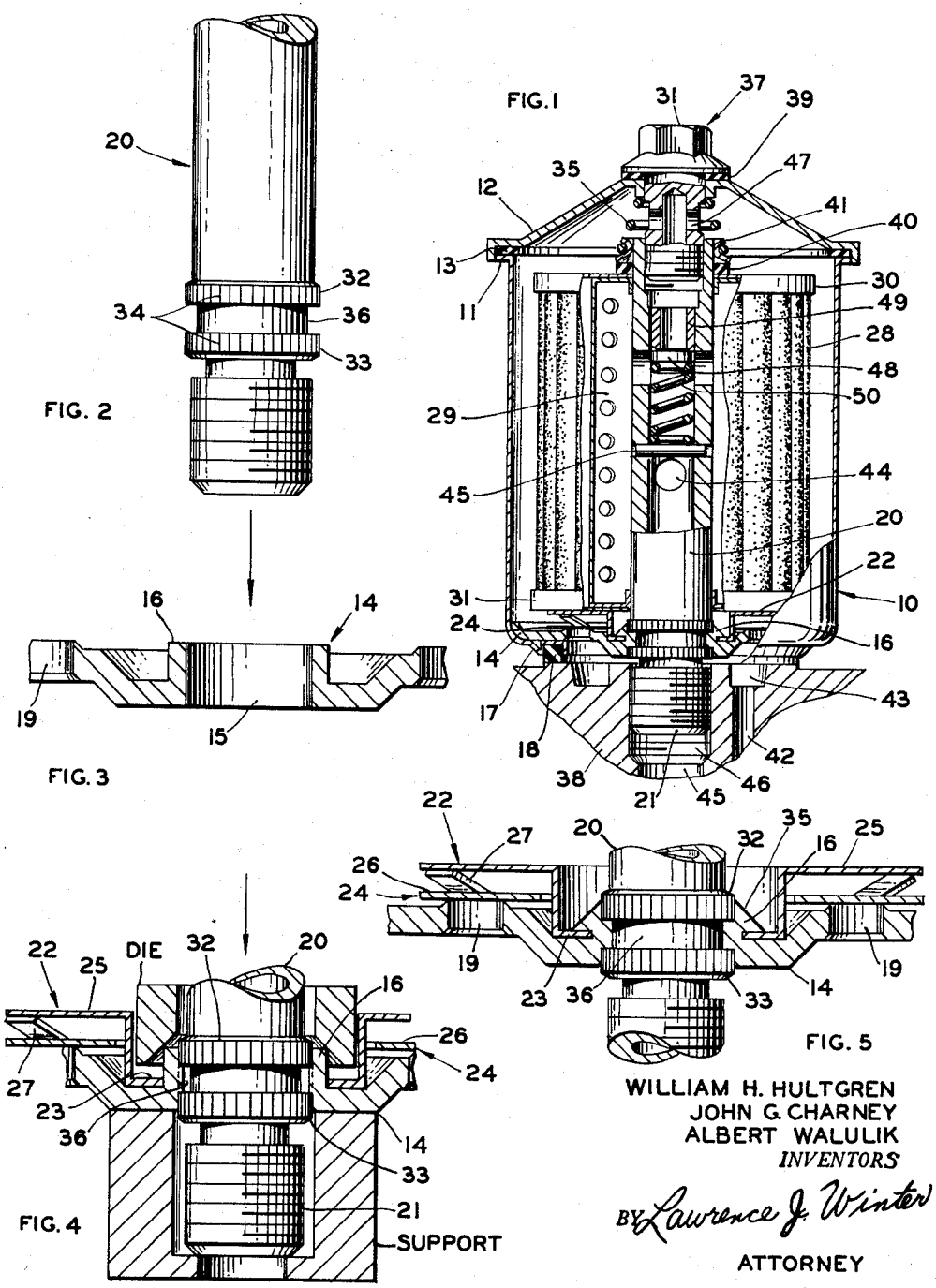
WILLIAM H. HULTGREN
JOHN G. CHARNEY
ALBERT WALULIK
INVENTORS
BY Lawrence J. Winter
ATTORNEY United States Patent Office 3,069,015
Patented Dec. 18, 1962

3,069,015
OIL FILTER
William H. Hultgren, Readington, John G. Charney, Colonia, and Albert Walulik, Cranford, N.J., assignors to Purolator Products, Inc., Rahway, N.J., a corporation of Delaware
Filed Dec. 7, 1959, Ser. No. 857,856
3 Claims. (Cl. 210—232)

The present invention relates to an oil filter and more particularly to an oil filter that is mounted directly on to the engine block of an internal combustion engine.

The present invention provides an oil filter cartridge that is disposed within a cylindrical metal casing having a hollow center tube or post which extends through the bottom of the housing and is threaded into the engine block. The other end of the center post is threaded to receive a headed bolt which secures a closure member to the casing. The closure member may be removed to give ready access to the interior of the metal housing to replace the filter cartridge therein when required.

It is an object of the present invention to provide novel means for joining the center post to the bottom member of the filter housing so there can be no relative rotation between the center post and bottom member of the housing, nor longitudinal movement with respect to each other.

It is another object of the present invention to provide a headed bolt and center post construction combined with the filter housing so that the housing may be readily screwed on to an engine block by means of the headed bolt and the headed bolt may be unthreaded in an opposite direction to remove the filter cover, without the center post and housing loosening or becoming inadvertently unthreaded from the engine block.

It is another object of the present invention to provide novel locking or gripping means between the center post and the bottom member of the filter casing to prevent relative rotation between the center post and bottom member, so that when the headed bolt screws the filter housing on to an engine block, a seal will result between the bottom of the housing and the engine block to prevent any oil leaks therebetween.

It is still a further object of the present invention to provide a full flow screw-on type oil filter for mounting on an engine block in which it is only necessary to replace the contaminated filter cartridge when clogged, by removing the cover member without removal of the antidrainback valve and bypass valve incorporated in the filter housing.

Various other objects and advantages of the present invention will be readily apparent from the following detailed description, when considered in connection with the accompanying drawings forming a part thereof, and in which:

FIG. 1 is a vertical view partly in section of the oil filter of the present invention screwed on an engine block;

FIG. 2 is an enlarged detail view of the novel center post construction embodied in the present invention;

FIG. 3 is an enlarged fragmentary detail view of the bottom member of the oil filter casing before the center post is joined to it;

FIG. 4 is an enlarged detail fragmentary view of the center post and bottom member of the oil filter casing properly positioned just prior to permanently joining them together; and FIG. 5 is a view similar to FIG. 4 illustrating the construction and shape of the center post and bottom member when they are permanently secured to one another.

Referring to the drawings, the reference numeral 10 generally designates a screw-on type cup shaped oil filter housing or casing having an open end provided with a lip 11 on which is supported a conical cover or closure member 12. A ring gasket 13 is disposed on lip 11 to provide a seal between the parts. The bottom of the thin metal casing is reinforced by a heavy circular bottom plate or member 14 having a central opening 15 therein formed by bending the plate inwardly into a sleeve 16. The lower end of the casing 10 is drawn or rolled over the outer portion of member 14 to which it is secured by tack-welding and terminates in a ring 17 rectangular shaped in cross section into which is press-fitted a rubber ring gasket 18. Member 14 is provided with a plurality of oil inlet ports 19 circumferentially spaced about opening 15, inwardly of ring 17.

A hollow center post 20 is disposed in casing 10 and extends below the casing through the central opening 15 where it is provided with external threads 21 for screwing the filter on to an engine block, as hereinafter described. An annular filter support ring 22 is disposed about post 20 and has a lower horizontal lip 23 (FIG. 5) secured to sleeve 16. An anti-drain back valve 24 is positioned around support ring 22 between its upper outwardly extending lip 25 by which it is held in the casing and bottom member 14. Valve 24 overlies the oil inlet ports 19 and prevents oil within the casing from draining back to the engine block when the engine is stopped. It consists of a ring 26 provided with spaced resilient projections 27 biased against filter support lip 25 to normally close off inlet ports 19 except when the engine is forcing oil through the filter casing. A resin impregnated annular pleated paper filter element 28 is disposed about post 20 and seats on lip 25 of support ring 22. The element has a perforated center tube 29 and turned down end discs 30 and 31 which seal off the pleat ends.

Center post 20 has spaced enlarged or upset portions 32 and 33 thereon adjacent the threaded lower end of the post. The cylindrical upset portions are formed on the post by working or deforming the material from a straight cylindrical configuration to that shown in FIG. 2 after which the outer wall of the upsets are then provided with longitudinal or vertical knurls 34 therein. Thereafter, member 14 is placed on a fixed support (FIG. 4) and center post 20 is inserted through central opening 15 of the member 14 until the knurled upsets are positioned adjacent sleeve 16, as shown in FIG. 4. The anti-drain back valve 24 and filter cartridge support ring 22 are then inserted over the center post until they rest against member 14, as shown in FIG. 4. Thereafter, a die (FIG. 4) is forced against sleeve 16 while it is held on the fixed support so that the sleeve 16 is deformed or reshaped into the conical shape 35 shown in FIG. 5, with the sleeve material forced into the space 36 between the knurled upsets and the upsets disposed in the spaced annular recesses formed in the sleeve, to permanently join the post and member to each other to prevent relative rotation of the knurled post sections with respect to member 14, and to prevent relative longitudinal movement of the post and member. A circumferential recess is also formed in the outer surface of the sleeve during the joining step, into which lip 23 of the support ring extends to lock the support member thereto and keep the anti-drain back valve locked thereon.

Referring to FIG. 1, the upper end of center post 20 is internally threaded, as at 36, to receive a threaded hollow bolt member 37 extending through the cover member to hold it on the casing. A hexagonal head 31 is provided on the bolt member to receive a wrench for screwing the casing tightly on to an engine block 38 so gasket 18 forms a seal therewith. A gasket 39 between the cover and bolt head prevents any oil from leaking therefrom. A ring gasket 40 is continuously pressed against the upper end of the filter element by a coiled spring 35 engaging a metallic ring 41. The other end of the spring abuts against the cover member 12.

Oil flows to the filter cartridge through an oil passage 42 and an annular recess 43 in the engine block in communication with the oil inlet ports 19 in the bottom member and then passes around the outside of filter cartridge 20. Clean oil is discharged into center post 20 through apertures 44 therein and is delivered to the engine bearings through oil passage 45 in the engine block. Passage 45 is disposed concentrically of annular recess 43 and is provided with a threaded enlarged countersink 46 in which the lower end of the post is threadably disposed.

Head bolt 37 is provided with openings 47 therein so that if the filter cartridge becomes clogged, the oil may bypass the cartridge and open the conventional relief or bypass valve 48 in the center post normally held seated against its valve ring 49 by spring 50 supported on a transversely extending pin 45 supported in holes in the center tube.

When it is desired to mount the oil filter of the present invention upon an engine block, the center post is threaded into the oil discharge countersink 46 in the engine block by hand until ring gasket 18 forms a hand-tight fit on the engine block. Thereafter, a wrench is applied to the head of bolt member 37 and torque is applied until the the gasket is slightly compressed against the engine block to form a fluid-tight seal therewith. The provision of the knurled upset portions 34 on the center post to which the sleeve 16 is fixedly secured by deforming the plate into the conical shape 35 shown in FIG. 5 prevents any slippage or relative rotation of the center post with respect to the bottom member of the casing so that upon screwing the oil filter unit on to the engine block a fluid-tight seal will be readily obtained.

When the oil filter cartridge has become clogged with contaminants or dirt, head bolt member is unthreaded by turning it in the opposite direction from which it was turned when the unit was mounted on the engine block and the cover 12 is separated from the casing without the center post inadvertently becoming unthreaded from the engine block. The center post does not separate or loosen from the engine block at this time because it requires a greater application of torque to separate bottom member 14 from the engine block and the center post fixedly secured to the bottom member, than the torque required to separate the head bolt 37 from top of the center post since diameter of ring gasket 18 holding the parts together is much greater than the head bolt diameter.

Inasmuch as various changes may be made in the particular form and arrangement of the article and in the steps of the process and other sequences as disclosed without departing from the principles of the invention, it will be understood that the invention is not to be limited except by the scope of the appended claims.

What is claimed is:

1. A screw-on type oil filter comprising a cylindrical casing with a bottom member having an inturned sleeve therein forming a central opening, oil inlet means spaced around said sleeve, said casing having a portion secured to said bottom member, said portion having a gasket-receiving ring surrounding said oil inlet means, a gasket secured in said ring and surrounding said oil inlet means, a hollow center post in the casing forming an oil discharge passage, an annular filter support disposed around said post, an annular pleated paper filter cartridge seated on said support, the lower end of said post extending through said central opening and being threaded for mounting the casing on an engine block, said sleeve having spaced annular recesses therein, knurled upset portions on said post secured in said recesses to prevent movement of the post with respect to the bottom member, said sleeve having a circumferential recess on its outer surface, a lip on said filter support secured in said recess, a detachable cover member forming a closure for the top of said casing, and a headed bolt means extending through the cover and threadably secured to said post on tightening the filter on an engine block.

2. A screw-on type oil filter comprising a cylindrical casing with a bottom, a hollow center post in the casing forming an oil discharge passage, the lower end of said post extending through said bottom, said lower end portion being directly secured to said bottom to prevent movement of said post with respect thereto and being threaded for mounting the filter on an engine block, oil inlet means disposed in said bottom adjacent said center post, a circular sealing gasket of a predetermined diameter, means for securing said sealing gasket coaxial with said casing and adjacent to the outside of said bottom around said oil inlet means and said center post, a filter cartridge disposed around said post, a cover member closing off the top of said casing, and bolt means extending through said cover member being threadedly secured to said post for holding said cover member on said casing, said bolt means when threadedly secured to said post being adapted to receive a wrench for tightening said threaded lower end portion of the filter on an engine block, the diameter of the area of engagement of said bolt means with said post and said cover member being a fraction of said predetermined diameter of said gasket, whereby the frictional torque acting at said larger predetermined diameter of the area of engagement of said gasket prevents movement of said filter with respect to said engine block when said filter is subjected to frictional torque at said smaller diameter of the area of engagement of said bolt means during removal of said bolt means.

3. A screw-on type oil filter comprising a cylindrical casing with a bottom member having a center opening and an oil inlet therein, a circular sealing gasket of a predetermined diameter, means for securing said sealing gasket coaxial with said casing and adjacent to the outside of said bottom member surrounding said inlet and said center opening, a hollow center post in the casing forming an oil outlet passage, an annular filter cartridge disposed around said post, the lower end portion of said post extending through said opening below said bottom and being directly secured to said bottom member to prevent movement of said post with respect thereto, said lower end portion being threaded for mounting the casing against an engine block, a detachable cover member closing off said casing, and bolt means extending through the cover member being threadedly secured to said post for holding said cover member on said casing, said bolt means when threadedly secured to said post being adapted to receive a wrench for tightening said threaded lower end portion of the filter on an engine block, an additional sealing gasket disposed between said bolt means and said cover member, the diameter of the area of engagement of said bolt member with said post and the diameter of the area of engagement of said additional sealing gasket with said bolt means and said cover member being a fraction of said predetermined diameter of said sealing gasket, whereby the frictional torque acting at said larger predetermined diameter of the area of engagement of said sealing gasket prevents movement of said filter with respect to said engine block when subjected to frictional torque at said smaller diameter of the area of engagement of said bolt means during the removal of said bolt means.

References Cited in the file of this patent

UNITED STATES PATENTS

| | | |
|---|---|---|
| 1,723,053 | McKinley | Aug. 6, 1929 |
| 1,792,854 | McKinley | Feb. 17, 1931 |
| 2,014,445 | Miller | Sept. 17, 1935 |
| 2,110,318 | Baruch | Mar. 8, 1938 |
| 2,203,495 | Kamrath | June 4, 1940 |
| 2,463,459 | Gunn | Mar. 1, 1949 |
| 2,696,915 | Kasten et al. | Dec. 14, 1954 |
| 2,888,141 | Coates et al. | May 26, 1959 |

FOREIGN PATENTS

| | | |
|---|---|---|
| 702,168 | Great Britain | Jan. 13, 1954 |